(12) United States Patent
Tobias et al.

(10) Patent No.: US 6,807,486 B2
(45) Date of Patent: Oct. 19, 2004

(54) METHOD OF USING UNDERBALANCED WELL DATA FOR SEISMIC ATTRIBUTE ANALYSIS

(75) Inventors: Steven M. Tobias, Houston, TX (US); Randall Cade, The Woodlands, TX (US)

(73) Assignees: Weatherford/Lamb, Houston, TX (US); The Energy Outpost Company, Houston, TX (US)

(*) Notice: Subject to any disclaimer, the term of this patent is extended or adjusted under 35 U.S.C. 154(b) by 0 days.

(21) Appl. No.: 10/259,217

(22) Filed: Sep. 27, 2002

(65) Prior Publication Data

US 2004/0064257 A1 Apr. 1, 2004

(51) Int. Cl.⁷ .................................................. G01V 1/28
(52) U.S. Cl. ............................................ 702/9; 702/13
(58) Field of Search ........................... 702/6, 9, 11, 12, 702/13, 14; 703/10; 175/48, 50; 73/152.03, 152.04, 152.19, 152.21, 152.22

(56) References Cited

U.S. PATENT DOCUMENTS

| | | | | |
|---|---|---|---|---|
| 5,444,619 A | | 8/1995 | Hoskins et al. | 364/421 |
| 5,586,082 A | | 12/1996 | Anderson et al. | 367/73 |
| 5,594,706 A | * | 1/1997 | Shenoy et al. | 367/76 |
| 5,615,115 A | * | 3/1997 | Shilling | 702/9 |
| 5,812,068 A | * | 9/1998 | Wisler et al. | 340/855.5 |
| 6,058,073 A | * | 5/2000 | VerWest | 367/31 |
| 6,129,152 A | | 10/2000 | Hosie et al. | 166/384 |
| 6,223,126 B1 | | 4/2001 | Neff et al. | 702/16 |
| 6,233,524 B1 | | 5/2001 | Harrell et al. | 702/9 |
| 6,263,284 B1 | | 7/2001 | Crider et al. | 702/14 |
| 6,272,434 B1 | * | 8/2001 | Wisler et al. | 702/9 |
| 6,302,221 B1 | * | 10/2001 | Hamman et al. | 175/50 |
| 6,328,118 B1 | | 12/2001 | Karigan et al. | 175/66 |
| 6,359,438 B1 | | 3/2002 | Bittar | 324/369 |
| 6,411,903 B2 | | 6/2002 | Bush | 702/14 |
| 6,609,067 B2 | * | 8/2003 | Tare et al. | 702/9 |
| 2002/0010548 A1 | * | 1/2002 | Tare et al. | 702/9 |
| 2002/0093879 A1 | * | 7/2002 | Mandal | 367/27 |
| 2002/0103630 A1 | * | 8/2002 | Aldred et al. | 703/10 |

* cited by examiner

*Primary Examiner*—Donald McElheny, Jr.
(74) *Attorney, Agent, or Firm*—Moser, Patterson & Sheridan, L.L.P.

(57) ABSTRACT

The present invention generally provides methods of geological analysis. The method includes collecting wellbore data from a well undergoing underbalanced drilling. The wellbore data is then correlated to a seismic data to predict geological properties away from the wellbore. In one embodiment, correlating the seismic data with the wellbore data involves converting the seismic data and the wellbore data to a one-dimensional numerical series, respectively. The two respective one-dimensional numerical series are compared to each other to produce a mathematical formulation relating the two series. In another embodiment, the wellbore data may be separated into different categories or classifications and individually compared to the seismic data. Preferably, the categories are compared to two or more variations of seismic data and their attributes to derive at unique "signatures" for the respective category. The signatures may then be used to produce "classification" maps of the wellbore data.

20 Claims, 6 Drawing Sheets

METHOD OF USING UNDERBALANCED WELL DATA FOR SEISMIC ATTRIBUTE ANALYSIS

BACKGROUND OF THE INVENTION

1. Field of the Invention

The present invention generally relates to methods for predicting reservoir properties. Particularly, the present invention relates to predicting reservoir properties using well data and seismic data. More particularly, the present invention relates to predicting reservoir properties using well data from a horizontal well.

2. Description of the Related Art

Seismic data properly acquired and processed may provide a wealth of information to an explorationist, one of the individuals within an oil company whose job it is to locate potential drilling sites. For example, a seismic profile gives the explorationist a broad view of the subsurface structure of the rock layers and often reveals important features associated with the entrapment and storage of hydrocarbons such as faults, folds, anticlines, unconformities, and sub-surface salt domes and reefs, among many others. This wealth of information increases the probability that a selected site will result in a productive well.

Seismic data is generally acquired by performing a seismic survey. A seismic survey maps the subsurface of the earth by sending sound energy down into the ground and recording the "echoes" that return from the rock layers below. The source of the down-going sound energy might come from explosions, seismic vibrators on land, or air guns in marine environments. During a seismic survey, the energy source is moved to multiple preplanned locations on the surface of the earth above the geologic structure of interest. Each time the source is activated, it generates a seismic signal that travels downward through the earth, is reflected, and, upon its return, is recorded at a great many locations on the surface. Multiple energy activation/recording combinations are then combined to create a near continuous profile of the subsurface that can extend for many miles. In a two-dimensional (2-D) seismic survey, the recording locations are generally laid out along a single straight line, whereas in a three-dimensional (3-D) survey the recording locations are distributed across the surface in a grid pattern. In simplest terms, a 2-D seismic line can be thought of as giving a cross sectional picture (vertical slice) of the earth layers as they exist directly beneath the recording locations. A 3-D survey produces a data "cube" or volume that is, at least conceptually, a 3-D picture of the subsurface that lies beneath the survey area.

After the survey is acquired, the data from the survey is processed to remove noise or other undesired information. During the computer processing of seismic data, estimates of subsurface velocity are routinely generated and near surface inhomogeneities are detected and displayed. In some cases, seismic data can be used to directly estimate rock porosity, water saturation, and hydrocarbon content. Less obviously, seismic waveform attributes such as phase, peak amplitude, peak-to-trough ratio, and a host of others, can often be empirically correlated with known hydrocarbon occurrences and that correlation applied to seismic data collected over new exploration targets. In brief, seismic data provides some of the best subsurface structural and stratigraphic information that is available, short of drilling a well.

To improve the usefulness of seismic data, a variety of techniques exist for enhancing the seismic information with other data. However, one problem in using seismic attributes is that their relation to actual rock properties is not obvious. There are unknown local factors that may affect the data in unexpected ways, and it is risky to predict functional relationships among seismic attributes and reservoir properties based on a simplified theoretical analysis with no familiarity of what "works" in a certain region. This problem is exacerbated by the fact that the wellbore data is traditionally derived from vertical or deviated wells. Because geological features are generally oriented parallel to the surface of the earth, a vertical or deviated well will only intersect a narrow region of the geological feature. As a result, the well will only provide data for a narrow region of the seismic attribute. Thus, many costly wells must be drilled to obtain the amount of data needed to obtain a sufficient level of region familiarity.

There is a need, therefore, for methods for predicting reservoir properties. Further, there is a need for methods for building knowledge of the area and for estimating reservoir properties with a minimum number of wells. There is also a need for methods for predicting reservoir properties using well production data.

SUMMARY OF THE INVENTION

The present invention generally provides a method of geological analysis. The method comprises collecting wellbore data from a well during a flow drilling operation. The wellbore data is then correlated to seismic data to predict geological properties away from the wellbore. An example of flow drilling operation includes underbalanced drilling operations. In one embodiment, correlating the seismic data with the wellbore data involves converting the seismic data and the wellbore data to a one-dimensional numerical series, respectively. The two respective one-dimensional numerical series are compared to each other to produce a mathematical formulation relating the two series.

In another embodiment, the wellbore data may be separated into different categories or classifications and individually compared to the seismic data. Preferably, the categories are compared to two or more variations of seismic data and their attributes to derive at unique "signatures" for the respective category. The signatures may then be used to produce "classification" maps of the wellbore data.

In another aspect, the present invention provides a method of seismic attribute analysis of a reservoir including obtaining a seismic survey of the reservoir; drilling a wellbore, the wellbore intersecting areas of interest within the reservoir; recording a wellbore data; and correlating the wellbore data to the seismic survey.

In another aspect, the present invention provides a method of drilling a well. The method includes collecting wellbore data from a well undergoing underbalanced drilling, correlating a seismic data with the wellbore data, determining a hydrocarbon rich zone, and directing a drill bit in a direction of the hydrocarbon rich zone.

BRIEF DESCRIPTION OF THE DRAWING

So that the manner in which the above recited features of the present invention, and other features contemplated and claimed herein, are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
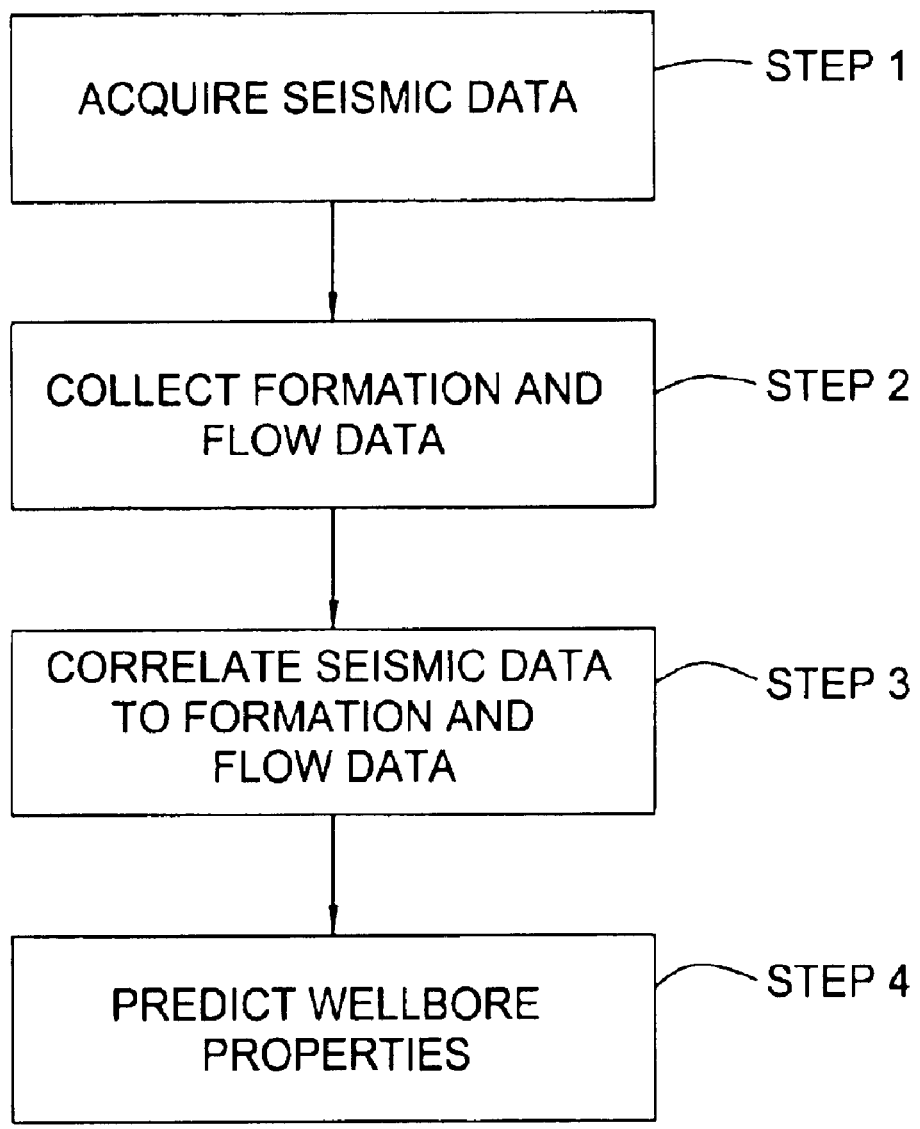
FIG. 1 is a flow diagram of a method of predicting reservoir properties according to one aspect of the present invention.

According to aspects of the present invention, horizontal well data and seismic data may be used in attribute analysis to predict static and dynamic formation properties over an entire formation. As used herein, static properties includes those unchanging rock properties such as porosity, shale content, ratio of sand to shale, etc. Dynamic properties refer to the flow of fluids through the formation. Further, a horizontal well is a well having a wellbore that deviates at least 30 degrees from vertical, preferably, more than 50 degrees from vertical, and most preferably, more than 70 degrees from vertical. FIG. 1 shows one embodiment of the process of predicting formation properties using seismic data and horizontal well data. In Step 1, a seismic survey is taken of the area of interest. Generally, the survey may be performed in any suitable manner known to one of ordinary skill in the art. In Step 2, an underbalanced horizontal well is drilled to collect formation and flow data over the length of the well. Then, in Step 3, the well data is used to correlate the seismic data, thereby fine tuning the seismic map. Finally, formation properties away from the wellbore may be predicted using the correlation, as shown in Step 4. It must be noted aspects of the present invention are not limited to underbalanced drilling operations, but are also applicable to other types of flow drilling operations.

Figure 2:
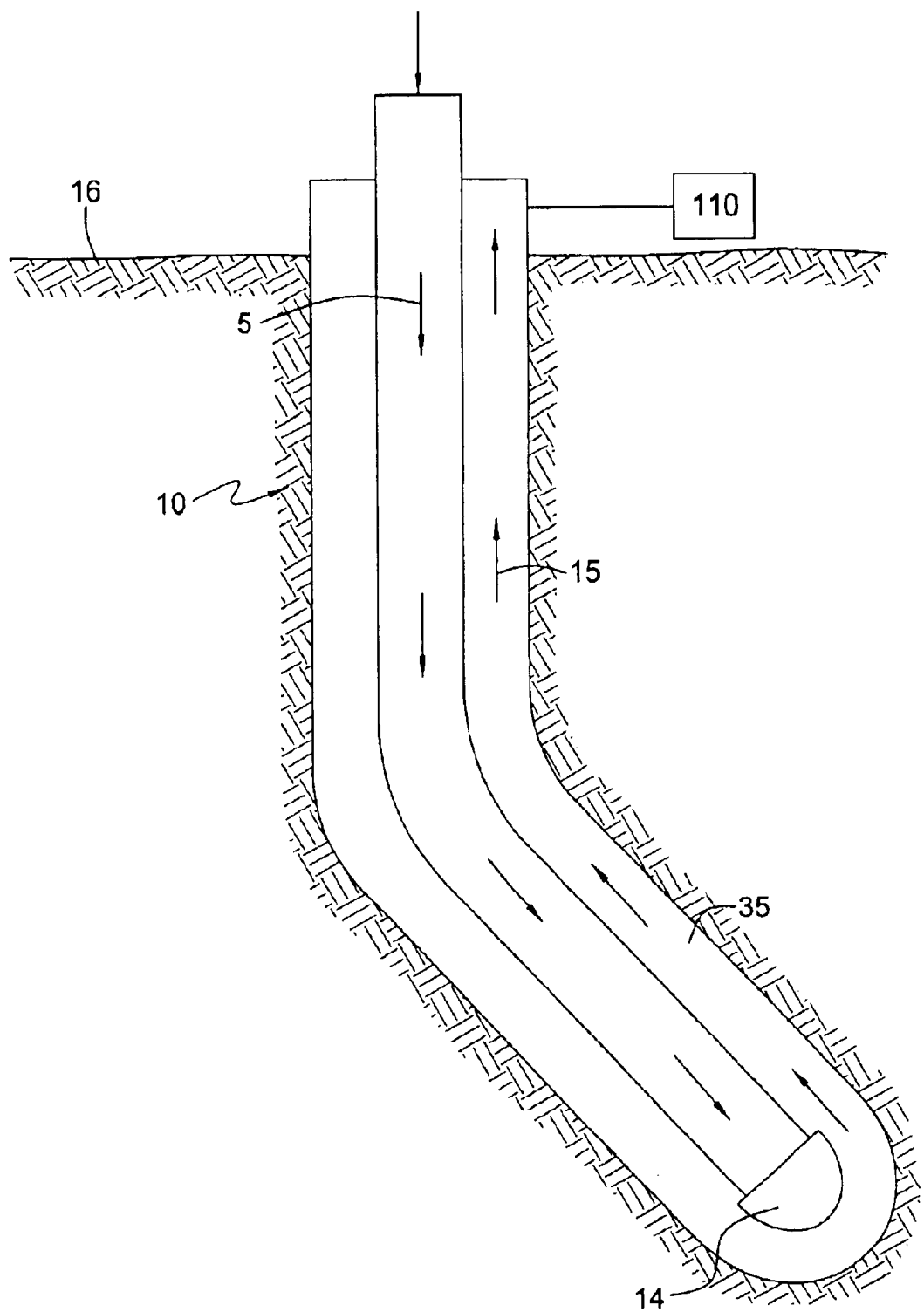
FIG. 2 is a schematic view of one embodiment of a horizontal well undergoing underbalanced drilling.

FIG. 2 depicts a horizontal well 10 undergoing underbalanced drilling. In underbalanced drilling, as opposed to conventional drilling, down-hole well pressure is maintained below the formation pressure. The underbalanced condition is desirable because it prevents contamination of the formation by reducing the chances that the drilling fluids and the "cuttings," suspended solids produced by the action of the drill bit, will be forced into the permeable reservoir formation. Further, because the formation pressure is higher, formation fluids tend to flow into the well and mix with the operating fluids during drilling.

The underbalanced condition may be achieved by using a relatively low density drilling fluid. Several types of drilling fluid exist in the industry for use in underbalanced drilling. Water-based and oil-based drilling muds may be used, however, water and lighter oil-based fluids, such as diesel fuel and crude oil, are more commonly used. In some situations the drilling fluid will have a specific gravity too high to successfully use in an underbalanced well. In such situation, additives, such as nitrogen gas, may be added to the drilling fluid to produce an operating fluid of a specific gravity capable of maintaining an underbalanced well.

As shown in FIG. 2, drilling fluid is pumped down 5 to the drill bit 14 and exits into the annular area 35. As the drilling fluid circulates back up 15 towards the surface 16, it mixes with rock cuttings produced from the drilling operations and with hydrocarbons from the formation. Thus, the returning wellstream typically reaches the surface wellhead as a mixture of formation oil, formation gas, well water, solid cuttings and operating fluid. This mixture is pumped out of the wellbore and delivered to a separator 110, which may include a four-phase separator or other suitable separators as known to one of ordinary skill in the art. The wellstream is processed in the separator 110 to produce separate streams of solid, oil, liquid, and gas.

During the separation of the returning wellstream, the hydrocarbon flow rate from the formation may be determined. A tracking member may be Included in the separation system to monitor changes in the rate of hydrocarbon production. Such changes may be attributed to changes in the position of the drill bit 14 and may indicate hydrocarbon presence and concentration. For example, an increase in the rate of hydrocarbon production would indicate that the drill bit 14 has traveled through a hydrocarbon-rich location. Thus, hydrocarbon production may be correlated to a drill bit position and recorded in the form of a log. Hence, one advantage of underbalanced drilling is that the operator may determine the hydrocarbon production at each location in the well 10.

Figure 3:
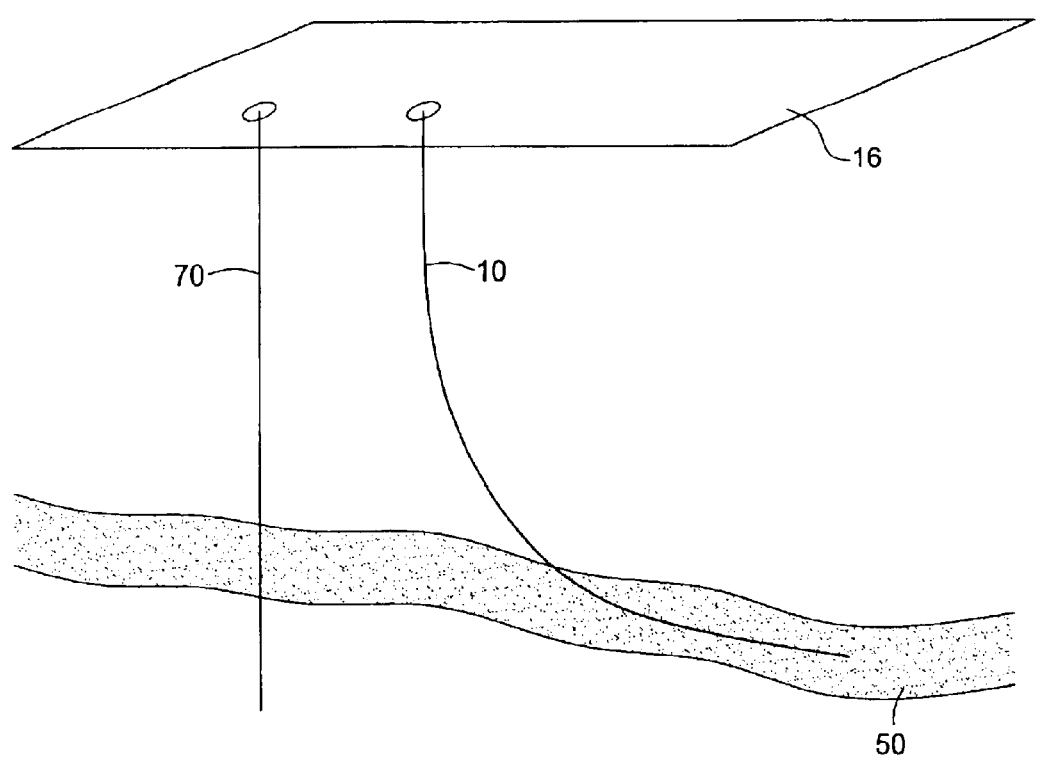
FIG. 3 shows the intersection of different wells with a feature in the earth.

In the preferred embodiment as shown in FIG. 2, a horizontal well 10 is drilled to provide the well data necessary for predicting the reservoir properties. The horizontal well 10 is preferred based on its ability to provide numerous data points from one well. As shown in FIG. 3, geological features 50 are typically oriented parallel to the surface 16 of the earth. As such, a horizontal well 10 may be drilled within a desired feature 50 and collect a series of data points from the desired feature 50. On the other hand, a vertical well 20 intersects a feature 50 in a narrow region, thereby providing a relatively small amount of data regarding each feature 50 it intersects. Hence, a number of vertical wells must be drilled to obtain the same amount of data available from just one horizontal well.

Figure 4A:
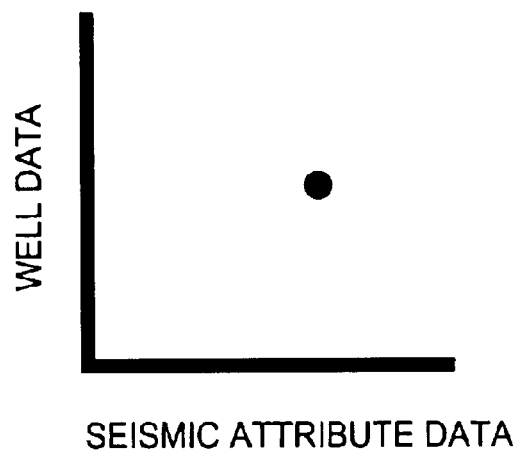
FIG. 4 is a chart demonstrating the differences in the quantity of data points collectible from different wells.
Figure 4B:
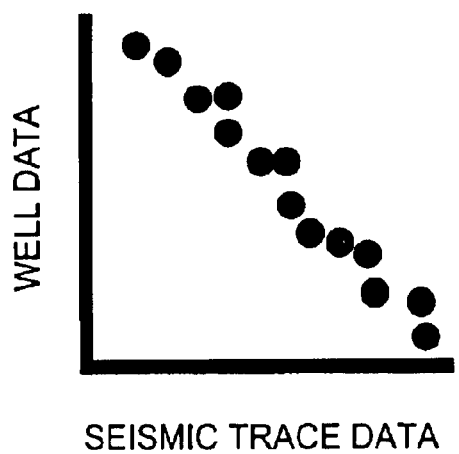
Figure 4C:
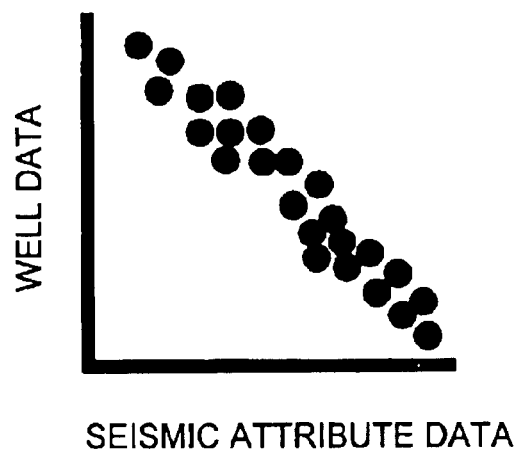

FIG. 4 further demonstrates this principle. Graph A shows formation data from a single vertical or deviated well. The graph shows a single data point that correlates to the average reservoir value of a given seismic attribute. There is only one data point because the vertical or deviated well intersects the formation in only a very narrow region. Graph B shows data from multiple vertical wells with each well contributing a single data point. While this method of data collection provides multiple data points, drilling multiple wells is very expensive. Graph C demonstrates data from a single horizontal well in accordance with the preferred embodiment. As discussed above, because the horizontal well intercepts the formation in many places, a great number of data points may be obtained from a single well.

Hence, an underbalanced well, drilled horizontally, may provide a great deal of dynamic well data for a single seismic attribute. For each characteristic recorded, a numerical set of data points describing that characteristic along the trajectory of the well is stored. The operator may record values for flow data for every location along the path of the well, thereby creating a "flow log." Such data may later be used to compare with the seismic information. It must be noted that aspects of the present invention contemplate creating a flow log from flow data collected after the well has been drilled or in any other manner known to a person of ordinary skill in the art. One method of collecting flow data includes operating a hydrocarbon measuring device downhole to determine the hydrocarbon flow rate at each location of the wellbore, which may be cased or uncased.

As discussed above, seismic data is analyzed using seismic attribute analysis to identify prospective geological features. Seismic attribute analysis typically involves complex signal analysis of seismic waveforms. Hydrocarbon trends may be determined from simple attributes such as peak amplitude, mean frequency, polarity, and reflection strength, or from more complex attributes that analyze the seismic trace in terms of its component frequencies or other types of spectra. In one embodiment, peak amplitude is used because it may be represented as a "bright-spot," which may be a direct indication of hydrocarbon. Once a geological feature can be correlated to one or more seismic attributes, then a two-dimensional seismic attribute map of that feature may be created.

Figure 5:
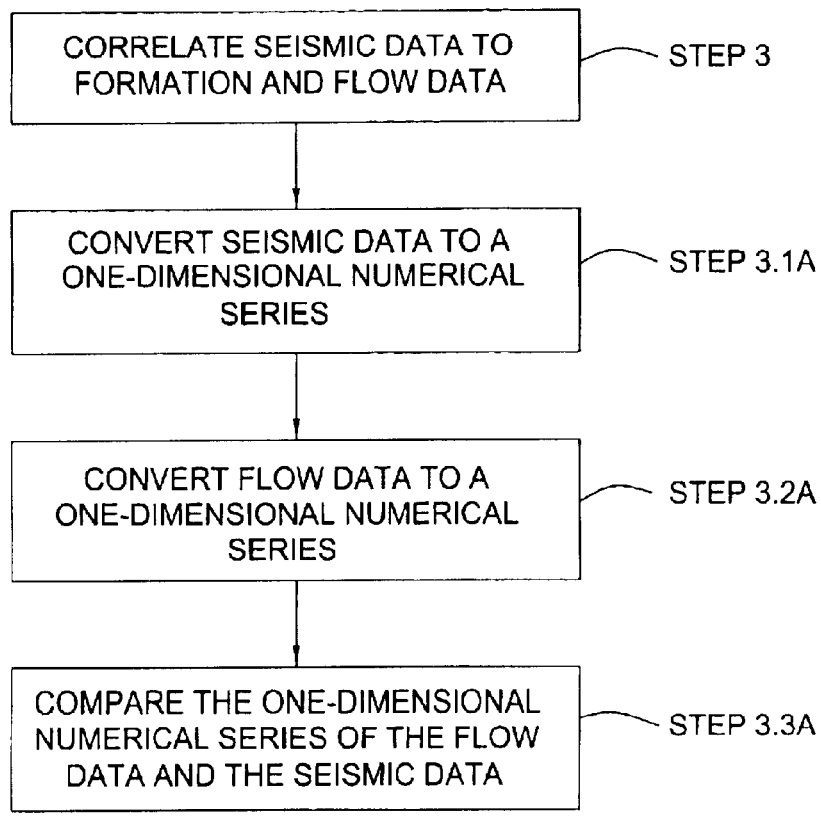
FIG. 5 is a flow chart demonstrating one embodiment of correlating seismic data to formation and flow data.

Returning to FIG. 1, Step 3 includes fine tuning the seismic map by correlating seismic attributes to the underbalanced well data. In the embodiment of fine tuning, as shown in FIG. 5, a series of two dimensional seismic attribute maps that define the target reservoir are sampled by a well trajectory that penetrates the target reservoir. Each seismic attribute map sampled in this manner results in a one-dimensional numerical series that describes a particular seismic attribute along the wellbore, as shown in 3.1A of FIG. 5. One or more of these one-dimensional numerical series may then be compared to a one-dimensional series of dynamic wellbore data, e.g., hydrocarbon flow data from the underbalanced well, as shown in 3.2A and 3.3A, so as to result in a mathematical formulation that relates the two series. This formulation may then be used to map the dynamic rock properties away from the wellbore using one of a number of commercially available algorithms, such as Landmark Rave, Geoquest SeisClass, and Geoquest Log Property Mapper. In this manner, the dynamic rock properties may be predicted over an entire reservoir, thereby reducing the number of unproductive wells drilled.

In application, underbalanced hydrocarbon flow data is collected for a horizontal well in a prospective reservoir. The flow data may then be correlated to one or more attribute maps describing the reservoir. For example, the flow data may be compared to an attribute map generated based on amplitude. The comparison results in a mathematical formulation in which hydrocarbon flow is described as a function of amplitude. This formulation may then be used to map the hydrocarbon flow properties away from the wellbore. Using commercially available algorithms, a colored map of the entire reservoir may be created in which each color on the map represents the potential hydrocarbon flow of that location. According to aspects of the present invention, additional attribute maps may be generated and compared to the flow data to further refine the seismic data. For example, the flow data may also be compared to an attribute map generated based on polarity. As a result, the flow data may be described as a function of amplitude and polarity.

Figure 6:
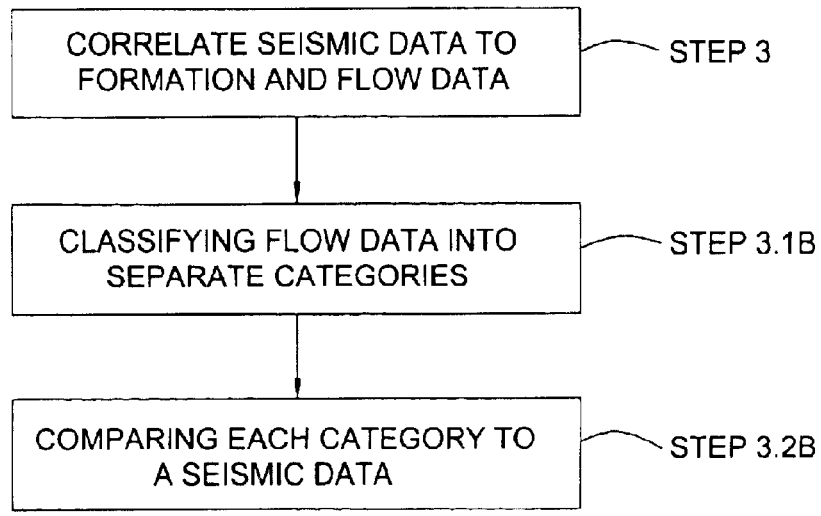
FIG. 6 is a flow chart demonstrating another embodiment of correlating seismic data to formation and flow data.

FIG. 6 illustrates another embodiment of fine tuning the correlation between seismic data and wellbore data. Particularly, in 3.1B and 3.2B, the wellbore data may be separated into different categories or classifications and individually compared to the seismic data. Preferably, the categories are compared to two or more variations of seismic data and their attributes to derive at unique "signatures" for the respective category. Specifically, the categories are mapped into n-dimensional seismic attribute space, which may result in a discrete n-dimensional "cluster" for each category. The signatures may then be used to produce "classification" maps of the wellbore data. The construction of the classification maps may be accomplished using one of many commercially available algorithms for multivariate statistics, cluster analysis, or artificial neural networks.

In application, the underbalanced flow data may be categorized as high, medium, and low hydrocarbon flow. The categorized data is then compared to three different attributes, such attributes A, B, and C. The results may show that each category may have similar attributes with regards to attributes A, B, and C. In other words, when mapped against a three-dimensional attribute space, with A, B, and C representing the X, Y, and Z coordinates, each category may show up as a "cluster" in the three-dimensional attribute space. Consequently, a flow map created for the entire reservoir may only have three colors, with each representing a category. The flow map may then be used to predict the potential for hydrocarbon flow for the entire reservoir.

In another aspect, the well data utilized in this invention may also consist of static rock properties. To measure static properties, a number of downhole tools placed in close proximity to the drill bit measure certain downhole operating parameters associated with the drill string. These downhole tools may include logging-while-drilling ("LWD") tools or measuring-while-drilling ("MWD") tools. These and other types of downhole tools may measure characteristics of the formation traversed by the wellbore. In this respect, characteristics such as gamma ray emissions, resistivity, pressure, temperature, and porosity may be recorded in the form of log and converted to a one-dimensional numerical series. Similar to predicting dynamic properties, this one-dimensional numerical may then be correlated to the one-dimensional numerical series that describes a certain seismic attribute to create maps that describes the static properties away from the wellbore. Alternatively, the static property may be categorized and compared to the seismic data. In another aspect still, the static and dynamic properties may be used in combination to predict reservoir properties away from the wellbore.

Figure 7:
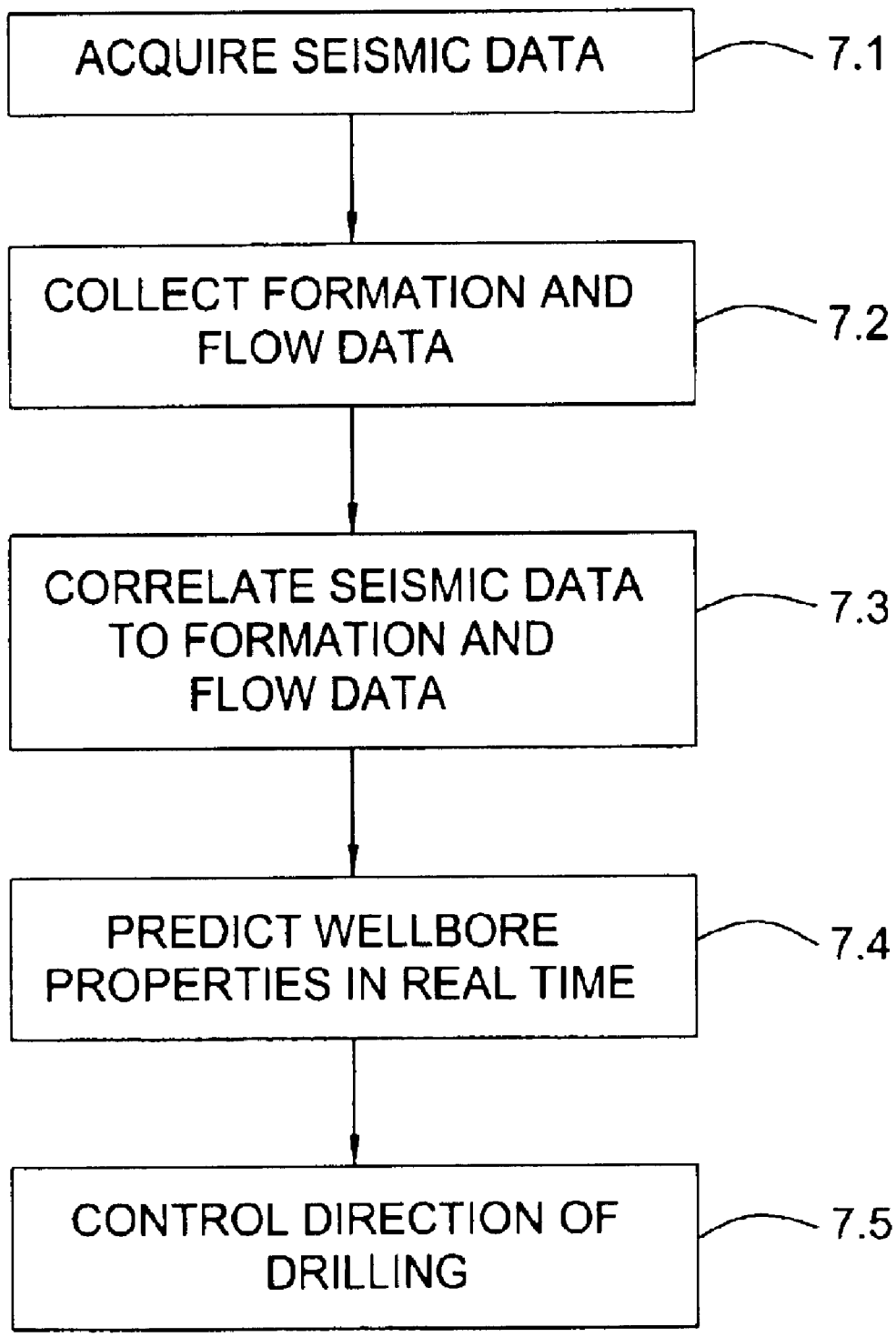
FIG. 7 is a flow chart demonstrating one embodiment of controlling the direction of drilling.

In another aspect, the present invention provides a method for directing the drill bit toward a hydrocarbon rich zone as illustrated in FIG. 7. In one embodiment, the drill string may include a LWD system as part of a "smart" system to automatically maintain the drill bit in the hydrocarbon-rich zone. Initially, the steps of acquiring and correlating the seismic data and flow data, steps 7.1, 7.2, 7.3, may be performed as described above. In step 7.4, underbalanced drilling may provide hydrocarbon flow data in real time, the analysis of seismic data and wellbore data to estimate the reservoir properties, may also be performed in real time. From the estimates of reservoir properties, the drill bit may be steered in the direction of the hydrocarbon rich zone in real time, see step 7.5. The drill may be steered using a directional drilling assembly as is known to a person of ordinary skill in the art. An example of a directional drilling assembly is a rotary steering assembly.

While the foregoing is directed to embodiments of the present invention, other and further embodiments of the invention may be devised without departing from the basic scope thereof, and the scope thereof is determined by the claims that follow.

We claim:

1. A method of geological analysis, comprising:

collecting hydrocarbon data from a well during flow drilling operations;

correlating a seismic data with the hydrocarbon data; and predicting geological properties using a correlation between the seismic data and the hydrocarbon data.

2. The method of claim 1, where the well is at least partially drilled horizontally.

3. The method of claim 1, wherein correlating the seismic data with the hydrocarbon data comprises:
deriving one or more attributes from the seismic data; and
comparing the one or more attributes of the seismic data to the hydrocarbon data.

4. The method of claim 3, further comprising:
converting each of the one or more attributes to a one-dimensional numerical series; and
converting the hydrocarbon data to a one-dimensional numerical series before comparing the data.

5. The method of claim 4, further comprising sampling a series of two dimensional seismic attribute maps by a trajectory of the well.

6. The method of claim 4, wherein the hydrocarbon data is collected in the form of a log.

7. The method of claim 1, wherein correlating the seismic data with the hydrocarbon data comprises:
classifying the hydrocarbon data into separate categories; and
comparing each category to one or more attributes.

8. The method of claim 7, further comprising creating a classification map that describes the geological properties.

9. A method of geological analysis of a reservoir, comprising:
obtaining seismic data of the reservoir;
drilling a wellbore using underbalanced conditions, the wellbore intersecting areas of interest within the reservoir;
recording a hydrocarbon data from the wellbore; and
correlating the hydrocarbon data to the seismic data.

10. The method of claim 9, wherein correlating the seismic data with the hydrocarbon data comprises:
converting one or more attributes derived from the seismic data to a one-dimensional numerical series coincident with a wellbore path;
converting the hydrocarbon data to a one-dimensional numerical series; and
comparing the one-dimensional numerical series of the one or more attributes to the one-dimensional numerical series of the hydrocarbon data.

11. The method of claim 10, further comprising sampling a series of two dimensional seismic attribute maps by a trajectory of the wellbore.

12. The method of claim 11, wherein the hydrocarbon data is collected in the form of a log.

13. The method of claim 12, wherein a result of the correlation is used to predict reservoir properties away from the wellbore.

14. The method of claim 9, wherein correlating the seismic data with the hydrocarbon data comprises:
classifying the hydrocarbon data into separate categories; and
comparing each category to one or more attributes.

15. The method of claim 14, wherein correlating the seismic data with the hydrocarbon data further comprises defining a signature for each category.

16. The method of claim 15, wherein correlating the seismic data with the hydrocarbon data further comprises using the signature to create classification maps that describe static and dynamic properties as seen by the wellbore.

17. The method of claim 16, wherein a result of the correlation is used to predict reservoir properties away from the wellbore.

18. The method of claim 9, wherein the wellbore is at least partially drilled horizontally.

19. A method of drilling a well, comprising:
collecting hydrocarbon data from a well during flow drilling operations;
correlating a seismic data with the hydrocarbon data;
determining a hydrocarbon rich zone; and
directing a drill bit in a direction of the hydrocarbon rich zone.

20. The method of claim 19, wherein flow drilling operations comprises underbalanced drilling.

* * * * *

UNITED STATES PATENT AND TRADEMARK OFFICE
CERTIFICATE OF CORRECTION

PATENT NO. : 6,807,486 B2  
DATED : October 19, 2004  
INVENTOR(S) : Steven Tobias et al.

Page 1 of 1

It is certified that error appears in the above-identified patent and that said Letters Patent is hereby corrected as shown below:

<u>Title page,</u>  
Item [73], Assignee, insert -- , Inc. -- after "Weatherford/Lamb".

Signed and Sealed this

Twenty-seventh Day of September, 2005

JON W. DUDAS  
*Director of the United States Patent and Trademark Office*